United States Patent Office 3,448,587
Patented June 10, 1969

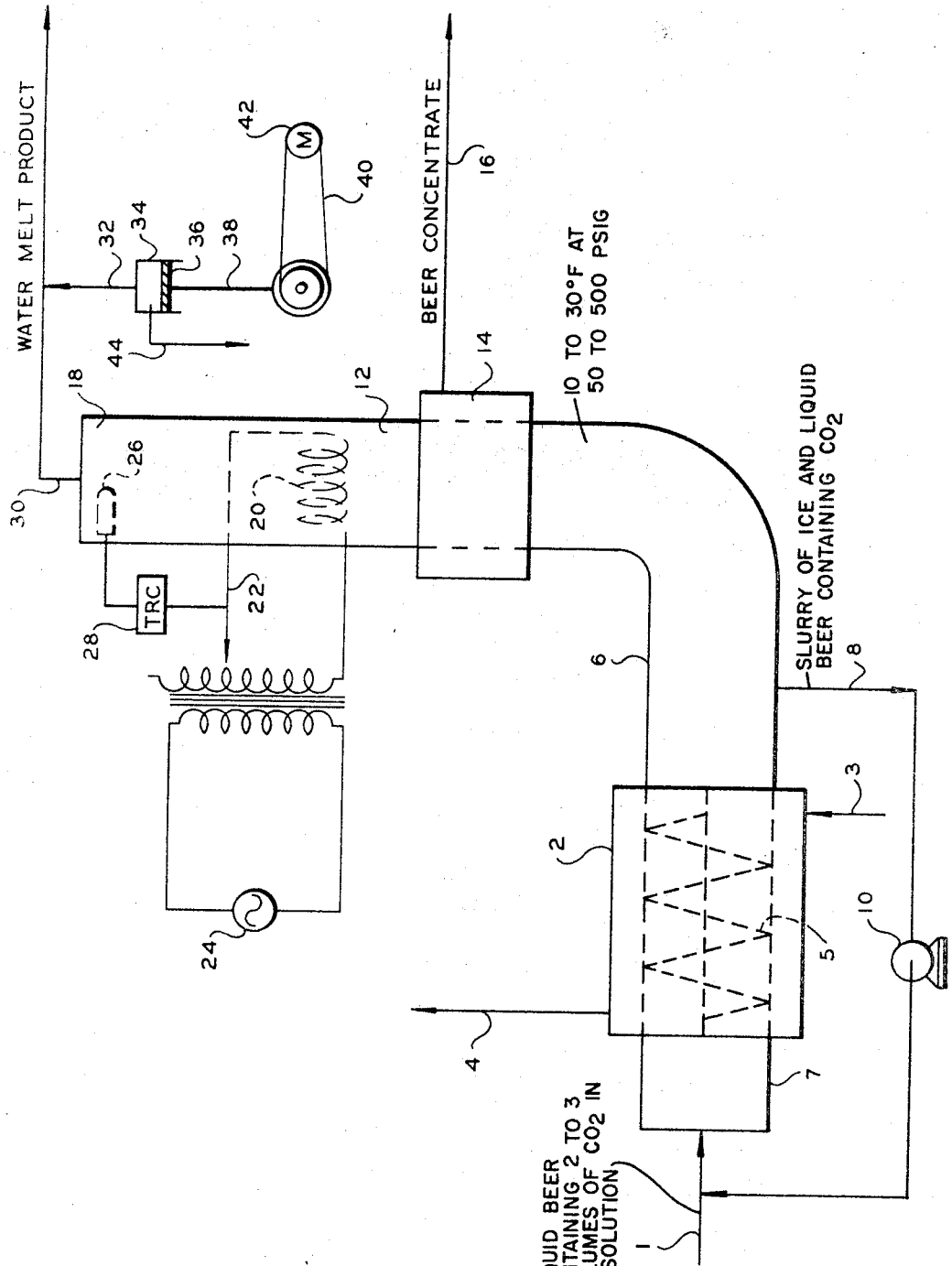

3,448,587
CONCENTRATION OF HIGH GAS CONTENT LIQUIDS
Howard W. Goard and Duane D. Shaul, Bartlesville, Okla., assignors to Phillips Petroleum Company, a corporation of Delaware
Filed July 11, 1966, Ser. No. 564,402
Int. Cl. C12c; B01d 9/04
U.S. Cl. 62—58                                    3 Claims

ABSTRACT OF THE DISCLOSURE

In a process for concentrating beer having a high gas content of from above 2 to 3 volumes of gas per volume of liquid by passing it as feed to a chilling zone, chilling it to form a crystal slurry, and passing a portion of said slurry to a crystal purification zone, in which crystals are purified, melted to a liquid melt, and the liquid melt separated from the concentrated liquid beer, the improvement comprising recycling the major portion of said slurry from said chilling zone directly back to the feed to said chilling zone without further processing, while maintaining a pressure of 50 to 500 p.s.i.g. in said chilling and purification zones. For best results the amount of said recycle is 80 to about 140 times the amount of said feed to said chilling zone.

---

This invention relates to concentration of high gas content liquids.

In one of its aspects it relates to a method for concentrating a high gas content liquid in which liquid is fractionally crystallized and a portion of the chiller effluent is recycled to the chiller feed.

Concentration of high gas content liquids such as beer has been proposed. Suitable beer concentrate can be shipped at a much reduced cost. In known concentrating processes, water is removed by distillation or by crystallization. In the distillation of beer, favorable aromatic gases are removed. This deleterious removal of aromatic gases can be prevented by fractional crystallization.

In fractional crystallization of high gas content liquids such as beer, problems have been encountered in maintaining a volume of gas during the concentration process. Generally the loss of the gas from the liquid during the concentration process causes channelling of the crystals within the purification column, which channelling decreases the column efficiency. Channelling is a localized melting in the purification zone whereby water is taken off with mother liquid and other crystals are insufficiently washed. Channelling also decreases the throughput capacity of a crystallizer.

In the purification of beer, it has been found that channelling is a function of $CO_2$ concentration. Using a conventional crystallizer, a maximum of two volumes of $CO_2$ per volume of feed can be maintained in the feed in order to avoid channelling. Since most beers contain two to three volumes of $CO_2$ per volume of feed, this prior art process is unsuitable for beer concentration.

We have now discovered, quite unexpectedly, that the volume of $CO_2$ in the feed can be increased to three volumes of $CO_2$ per volume of feed if a portion of the effluent from the chiller is directly recycled to the chiller feed without further processing.

In the concentration of fluids using fractional crystallization, it has been suggested to recycle the chiller effluent through a holding zone or crystal growth tank. We have discovered that this crystal growth or holding zone step can be avoided with substantial improvement when high gas content liquids are being concentrated and the chiller effluent is recycled to the chiller feed. The direct recycle to the feed eliminates channeling of the column in high gas content liquid purification.

By various aspects of this invention, one or more of the following, or other, objects can be obtained.

It is an object of this invention to purify a high gas content liquid.

It is a still further object of this invention to provide a process for the purification of high $CO_2$ content beer.

It is a further object of this invention to purify beer having two to three volumes of $CO_2$ per volume of beer.

It is still another object of this invention to eliminate channeling and increase the throughput in a crystallization process wherein the liquid feed to the process contains a high content of gases.

Other aspects, objects, and the several advantages of this invention are apparent to one skilled in the art from a study of this disclosure, the drawing, and the appended claims.

According to the invention, a liquid containing a high gas content is passed through a fractional crystallization zone in which it is first contacted by a chilling zone to solidify at least a portion of the feed. The slurry is passed from the chilling zone to a purification zone in which liquids are separated from solids. A portion of the effluent from the chilling zone is recycled to the feed to the chilling zone.

In one embodiment of the invention, the crystals are washed in the purification zone and mother liquor is removed therefrom. The crystals are passed to a heating zone wherein they are melted and removed as liquid product. A portion of the melted liquid is passed countercurrently into the crystals to wash and purify the same. This wash liquid refreezes in the crystal mass and is returned to the heating zone.

In another embodiment of the invention, the liquid in at least one of the purification zones and the melting zone is subjected to a pulsating pressure.

The invention will now be described with reference to the accompanying drawing which shows an embodiment of the invention.

Referring now to the drawing, a liquid feed containing at least two liquid components and a high content of gas is passed through line 1 to crystallizer column 7. The liquid passes into a chilling zone 2 in which at least a portion of the liquid is solidified. Coolant is indirectly heat exchanged with the liquid in zone 2, the coolant entering through line 3 and leaving through line 4 of chilling zone 2. A scraper or auger 5 is provided to maintain the surface of the housing free from accumulated solids. Auger 5 is mounted on a rotatable shaft and driven by a motor (not shown) at a speed of about 10 to about 1000 r.p.m. Generally, the amount of solids formed in 2 is between 40 and 50 percent. The crystal slurry from 2 is passed through housing 6 to the separation section 12 of the column. According to the invention, a portion of this crystal slurry is removed from housing 6 through line 8 and passed by pump 10 to line 1. It is to be noted that the slurry in line 8 is passed directly to line 1 without any further processing.

A filter means 14 is provided to remove liquids from the crystal slurry. The liquid is removed through line 16 as a concentrate. The crystal mass is passed through purification zone 12 to melting zone 18 of the column. In purification zone 12, the crystal mass is countercurrently contacted with a liquid. The crystals are melted in zone 18 and a portion of the melted liquid is used to countercurrently contact the crystals in zone 12. This countercurrent contact of the solids and liquid serves to purify and wash the crystals in zone 12. A heater means 20 is provided in melting zone 18 to melt the purified crystal mass. The melt product is removed through line 30.

Heater means 20 can be in the form of an electrical heater (as shown) or a heat transfer coil through which a suitably heated fluid is pumped. Electrical power is transmitted to heater means 20 from power source 24 by means of a suitable variable power transformer device such as a variable transformer 22. The variable transformer 22 can be controlled by a temperature recorder controller 28 which adjusts variable transformer 22 in accordance with a signal produced from a thermal sensing means 26.

Pulsation-producing means 34 communicates with the purification column through conduits 32 and 30 to force the reflux countercurrent to the crystal flow in the purification zone 12. Pulsation-producing means 34 comprises a cylinder with a reciprocal piston 36 sealed therein. Reciprocation of piston 36 is produced, for example, by electric motor 42, a belt 40, a crank means and connecting rod 38 which is sealed in housing 34 by means of a packing gland. An outlet 44 is provided in housing 34 to facilitate reciprocation of piston 36 and can be connected to means (not shown) for recovery of any material which might escape from the purification column in case of failure of piston 36. The reciprocation of piston 36 can be at any suitable rate, such rate being dependent upon the separation being made in the column and the solids content maintained therein. Generally, pulsations will be produced from the reciprocation of piston 36 in the range of about 100 to 500 pulsations per minute.

It is within the scope of the invention to remove the mother liquor, concentrate, from line 10 and pass it to a further crystal purification zone, or to recycle the mother liquor to the feed 1.

Generally, the column will be operated under sufficient pressure to maintain gases dissolved in the liquid phase. The pressure will therefore depend on the nature of the liquids and the gases which are to be concentrated. Generally, for the concentration of beer, which is the preferred embodiment of the invention, the pressure will range from 50 to 500 p.s.i.g., preferably from 100 to 300 p.s.i.g.

The temperature in the various sections will also vary depending upon the type of liquid to be concentrated and the gases will depend upon the nature of the liquids which are to be concentrated. Generally, for the concentration of beer, the liquids will be cooled in the chiller to a temperature between 10 and 30° F., preferably between 15 and 25° F.

The invention is also used to advantage in concentrating non-aqueous systems which contain little or no gas. Examples include the separation of para xylene from a mixed xylene feedstock. Circulation of crystal slurry around the chiller while processing a xylene feedstock causes the crystals to be substantially larger in size, thereby increasing both the capacity and separating efficiency of the downstream purification column.

The invention can also be used in purifying benzene, cyclohexane, naphthalene, para-cresol, para-dichlorobenzene, waxes, and high molecular weight normal paraffins. It can also be used in concentrating aqueous systems such as milk, orange juice, coffee, vegetable juices, etc.

*Specific example*

During the operation of a semi-commercial plant, beer containing 3.6 to 3.8 weight percent ethyl alcohol and 2.0 to 3.0 volumes of carbon dioxide per volume of beer was passed at the rate of 52 gallons per hour into a 20-foot-long scraped-surface chiller with an interior diameter of 12 inches. Propane was evaporated in a jacket surrounding the chiller at a temperature of 5° F., thereby producing a slurry of 45 to 55 weight percent ice crystals in the crystal slurry leaving the chiller at a temperature of 22° F. Part of the crystal slurry from the chiller was recycled to the feed end of the chiller at a rate of 70 to 120 gallons per minute. Ratio of recycle crystal slurry to fresh feed thus varied from 80 to about 140.

Additional crystal slurry was passed from the chiller into a 10-foot-long purification column with an interior diameter of 6 inches. Beer concentrate containing 7.5 weight percent ethyl alcohol and containing 6.2 volume of $CO_2$/volume of liquid in solution was removed from the mother liquor filter at a rate of 28 gallons per hour. Water with a purity of 99.9+ weight percent was removed from the melter end of the column at a rate of 24 gallons per hour. The column was pulsed with a reciprocating pump with a displacement of 6 cubic inches. Reciprocation frequency was 300 cycles per minute. Performance of the crystallizer as described above was very good, i.e., the reject water contained negligible alcohol and throughput of the unit was high. Crystal size averaged 0.25 to 0.41 millimeter. However, without recycle of the slurry around the chiller, the unit could not be operated at such a high rate and with such a high water purity; the column channelled frequently and performance was generally unacceptable. Crystal size was found to decrease to 0.16 to 0.29 millimeter.

Reasonable variation and modification are possible within the scope of the foregoing disclosure, the drawing and the appended claims to the invention without departing from the spirit thereof.

We claim:

1. In a method for concentrating by fractional crystallization a liquid beer having a high gas content of from above 2, to 3 volumes of gas per volume of liquid, comprising passing said liquid as feed to a chilling zone in which said liquid is chilled to between 10 and 30° F. to form at least some solid crystals, removing a slurry of said solid crystals and liquid from said chilling zone, and passing a portion of said slurry to a purification zone in which crystals are purified, melted to a liquid melt, and the liquid melt separated from the concentrated liquid beer, the improvement comprising recycling said slurry from said chilling zone directly back to the feed to said chilling zone without further processing thereof in an amount equal to 80 to about 140 times the amount of fresh feed to said chilling zone, while maintaining a pressure of 50 to 500 p.s.i.g. in said chilling and purification zones.

2. A method according to claim 1 wherein said crystal slurry is passed to a purification zone wherein mother liquid is separated from said crystals and removed as a product, crystals are passed to a purification zone in which said crystals are contacted with a countercurrent flow of liquid, said crystals are passed from said purification zone to a melting zone in which said crystals are melted, a portion of the melted crystals is removed as a product, and a portion of said melted crystals is refluxed back through said crystals as said countercurrent liquid which contacts said crystals.

3. A method according to claim 2 wherein the liquid in at least one of said purification zone and said melting zone is subjected to a pulsating pressure.

References Cited

UNITED STATES PATENTS

| | | | |
|---|---|---|---|
| 2,896,419 | 7/1959 | Thompson | 62—58 |
| 3,182,463 | 5/1965 | Stearns | 62—58 |
| 3,269,136 | 8/1966 | Umand | 62—58 |
| 3,327,492 | 6/1967 | Goard et al. | 62—58 |
| 3,339,372 | 9/1967 | Cottle | 62—58 |
| 3,240,025 | 3/1966 | Malick et al. | 62—58 |
| 3,285,024 | 11/1966 | Dunn et al. | 62—58 |
| 3,295,988 | 1/1967 | Malick et al. | 62—58 |

NORMAN YUDKOFF, *Primary Examiner.*

U.S. Cl. X.R.

99—31, 199